(No Model.)
J. N. HOLLAND
LAND LEVELER.
No. 425,793. Patented Apr. 15, 1890.
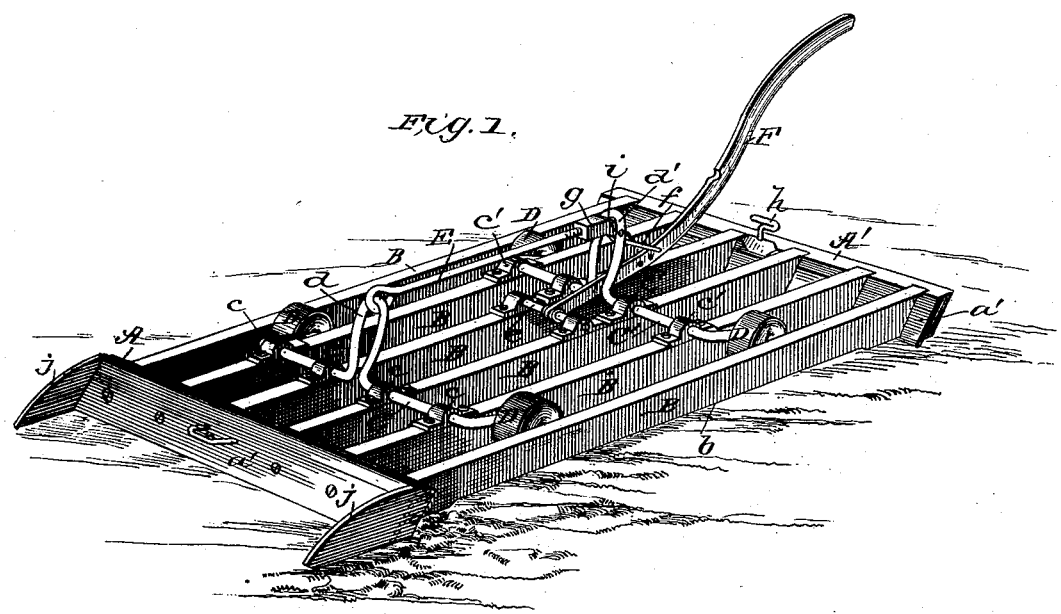
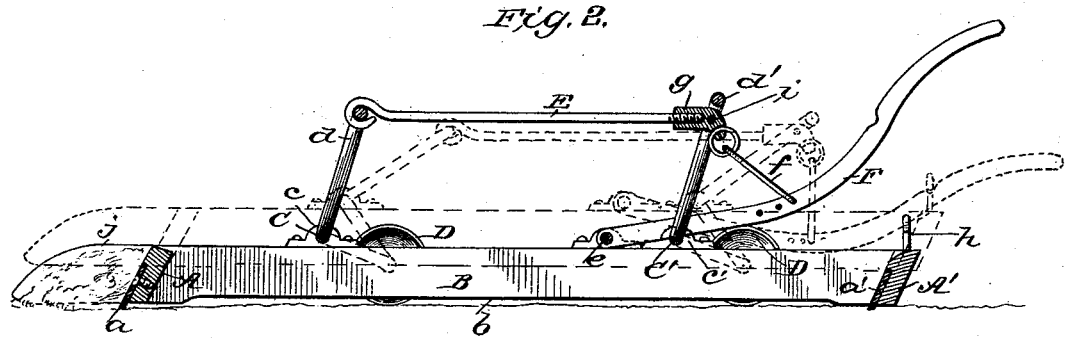
WITNESSES:
INVENTOR:
John N. Holland.
BY
ATTORNEYS

UNITED STATES PATENT OFFICE.

JOHN NELSON HOLLAND, OF PUEBLO, COLORADO.

LAND-LEVELER.

SPECIFICATION forming part of Letters Patent No. 425,793, dated April 15, 1890.

Application filed February 6, 1890. Serial No. 339,491. (No model.)

*To all whom it may concern:*

Be it known that I, JOHN NELSON HOLLAND, residing at Pueblo, in the county of Pueblo and State of Colorado, have invented a new and useful Improvement in Land-Levelers, of which the following is a specification.

The object of my invention is to provide a machine for leveling land, and more especially for such lands as are farmed by irrigation. These lands require to be made very level in order to secure a uniform distribution of water over the surface, and it frequently occurs that land which appears to be perfectly level will, when the water is turned on, show a series of hills and holes which must be brought to a common level to secure the best results. This involves a great deal of time and labor which my invention is designed to reduce; and to that end it consists in the peculiar construction and arrangement of a frame with scraping-edges, and means for raising, lowering, and transporting the frame, as will be hereinafter fully described with reference to the drawings, in which—

Figure 1 is a perspective view, and Fig. 2 a vertical longitudinal section.

A is the front and A' the rear scraper-beams, which are set at an inclination, with their lower edges advanced, and armed each with a metal blade or scraping-edge $a$ $a'$. These scraper-beams are connected by parallel longitudinal bars B, whose lower edges $b$ are reduced or cut away from contact with the earth, so that they do not rest upon the ground and retard the progress of the machine with unnecessary friction. In bearings $c$ near the front ends of these bars is journaled a crank-axle C, whose ends carry running wheels D, whose tires or faces are made broad, (six inches, more or less,) so that they do not bury in the soft earth. The middle of the crank-axle is bent up into a loop-crank $d$. Near the rear ends of the bars B, in bearings $c'$, is arranged another crank-axle C', having at its ends running wheels D, and in its center a loop-crank $d'$, which is connected with the loop-crank of the front crank-axle by a rod E.

F is a hand-lever, which is fulcrumed upon a short shaft $e$ in front of the rear crank-axle and extends through the loop of the said crank-axle, and is connected by a link $f$ to a connection $g$ of rod E. This connection is in the nature of a block or casting hung upon a short pin $i$, extending through the loop near its end, and having a screw-threaded connection with the rod E, by which the length of the rod may be adjusted to suit the loop-cranks of the two crank-axles. The lever F extends over the rear end of the scraper-frame into range of convenient manipulation by the driver.

Now by means of the lever, the connected crank-axles, and the running wheels the scraper-frame may be either let down to contact with the ground or raised above it upon the transporting-wheels. Thus when the lever is raised the frame of its own weight falls to the ground and the scraper-beams are in position to scrape and level the field. When, however, the lever is forced down to its lowest position, it rocks the crank-axles, and by forcing down the running wheels raises the frame out of contact with the ground, so that it may be transported. In this position the lever may be locked by a hook or catch $h$ on the rear of the frame.

In operating the machine the field is first plowed and harrowed, and the frame then dragged by the team across the high places to the low places, the earth being taken in a thinner or thicker layer and distributed in a thinner or thicker layer, according to the requirements of the ground, by raising and lowering the lever, which, through the wheels, adjusts the relation of the scraping-edges higher or lower, as the case may be.

To prevent the earth which accumulates at the front of the scraper-beam from falling away past the ends of said beam, I apply runner-blades or side boards $j$ to the ends, said boards projecting in front of said beam.

If desired, I may employ a third scraper-beam placed midway the length of the frame.

My invention will be found useful not only for leveling fields, but also as a road-scraper for leveling and grading road-beds.

Having thus described my invention, what I claim as new, and desire to secure by Letters Patent, is—

1. A land-leveler consisting of a frame with transverse scraper-beams at front and rear, and a pair of crank-axles with running wheels arranged one at the front and the other at the rear of said frame, combined with a connecting-rod and a lever for operating them simultaneously to raise and lower the frame, substantially as shown and described.

2. A land-leveler consisting of a frame composed of parallel longitudinal bars with transverse scraper-beams at the ends, combined with a pair of crank-axles with running wheels arranged at front and rear of said frame, a connecting-rod for the crank-axles, and a lever for operating them, substantially as shown and described.

3. The combination, with the scraper-frame and the two sets of crank-axles and wheels, of the rod E and screw-connection $g$, for connecting the cranks of the two shafts, substantially as shown and described.

JOHN NELSON HOLLAND.

Witnesses:
A. W. FOOTE,
C. H. VAN NESS.